US012229367B2

(12) United States Patent
Leng et al.

(10) Patent No.: US 12,229,367 B2
(45) Date of Patent: Feb. 18, 2025

(54) COMBINATION STRUCTURE FOR TOUCH DEVICE AND WEARABLE DEVICE

(71) Applicant: GUANGDONG COROS SPORTS TECHNOLOGY JOINT STOCK COMPANY, Dongguan (CN)

(72) Inventors: Hu Leng, Dongguan (CN); Hongbo Xu, Dongguan (CN)

(73) Assignee: Guangdong Coros Sports Technology Co., Ltd, Dongguan (CN)

( * ) Notice: Subject to any disclaimer, the term of this patent is extended or adjusted under 35 U.S.C. 154(b) by 0 days.

(21) Appl. No.: 18/526,756

(22) Filed: Dec. 1, 2023

(65) Prior Publication Data

US 2024/0103661 A1   Mar. 28, 2024

Related U.S. Application Data

(63) Continuation of application No. PCT/CN2021/113645, filed on Aug. 19, 2021.

(51) Int. Cl.
*G06F 3/041* (2006.01)
*G04G 17/04* (2006.01)
*G04G 21/08* (2010.01)

(52) U.S. Cl.
CPC ......... *G06F 3/04164* (2019.05); *G04G 17/04* (2013.01); *G04G 21/08* (2013.01)

(58) Field of Classification Search
CPC .............................................. G06F 3/041–048
See application file for complete search history.

(56) References Cited

U.S. PATENT DOCUMENTS

| 2016/0254587 A1* | 9/2016 | Jung | ...................... H01Q 7/00 |
| | | | 343/702 |
| 2023/0071460 A1* | 3/2023 | Ko | ........................ H10K 59/40 |

FOREIGN PATENT DOCUMENTS

| CN | 204086831 U | 1/2015 |
| CN | 105158999 A | 12/2015 |
| CN | 109947297 A | 6/2019 |
| CN | 212814797 U | 3/2021 |
| KR | 20160002565 A | 1/2016 |

OTHER PUBLICATIONS

The World Intellectual Property Organization (WIPO) International Search Report for PCT/CN2021/113645 May 12, 2022 5 Pages.

\* cited by examiner

*Primary Examiner* — Roy P Rabindranath
(74) *Attorney, Agent, or Firm* — ANOVA LAW GROUP, PLLC

(57) ABSTRACT

A combination structure of a touch device includes an annular outer frame, a glass cover plate, a touch control board, and a flexible circuit connected to the touch control circuit board. The glass cover plate is arranged in a middle area of the annular outer frame and connected to the annular outer frame. The touch control circuit board and the flexible circuit are arranged below the glass cover plate. A lower end of the annular outer frame includes a concave groove configured to accommodate the flexible circuit. A bottom surface of the glass cover plate includes a step structure.

19 Claims, 2 Drawing Sheets

COMBINATION STRUCTURE FOR TOUCH DEVICE AND WEARABLE DEVICE

CROSS-REFERENCE TO RELATED APPLICATION

This application is a continuation of International Application No. PCT/CN2021/113645, filed Aug. 19, 2021, the entire content of which is incorporated herein by reference.

TECHNICAL FIELD

The present disclosure generally relates to the smart touch control technology field and, more particularly, to a combination structure for a touch device (touch control device) and a wearable device.

BACKGROUND

In a smart wearable device, especially a smartwatch, in order for a face frame and a glass cover plate to be easily joined, a platform structure is configured at an inner side of the face frame to support the glass cover plate. Generally, the whole glass cover plate is arranged on the platform. To add a touch screen function to the watch, a touch control circuit layer needs to be arranged on the back side of the glass cover plate. The touch control circuit layer is glued to the back side of the glass cover plate and connected to a motherboard through a flexible circuit (TP). In general, TP needs to be bent at least once to pass around a display functional layer to be connected to the motherboard.

In the existing technology, a joint area between TP and the touch control circuit layer is increased to reduce the space needed for bending. However, on the one hand, the technology causes the joint area of the touch control circuit layer to be larger, which increases the black edge of the display screen and affects the user experience. On the other hand, since the bending segment is short, the flexible circuit board is easily broken, causing the device to not work.

SUMMARY

In accordance with the disclosure, there is provided a combination structure, including an annular outer frame, a glass cover plate, a touch control board, and a flexible circuit connected to the touch control circuit board. The glass cover plate is arranged in a middle area of the annular outer frame and connected to the annular outer frame. The touch control circuit board and the flexible circuit are arranged below the glass cover plate. A lower end of the annular outer frame includes a concave groove configured to accommodate the flexible circuit. A bottom surface of the glass cover plate includes a step structure.

In accordance with the disclosure, there is provided a wearable device, including a combination structure of a touch device. The combination structure includes an annular outer frame, a glass cover plate, a touch control board, and a flexible circuit connected to the touch control circuit board. The glass cover plate is arranged in a middle area of the annular outer frame and connected to the annular outer frame. The touch control circuit board and the flexible circuit are arranged below the glass cover plate. A lower end of the annular outer frame includes a concave groove configured to accommodate the flexible circuit. A bottom surface of the glass cover plate includes a step structure.

REFERENCE NUMERALS

Figure 1:
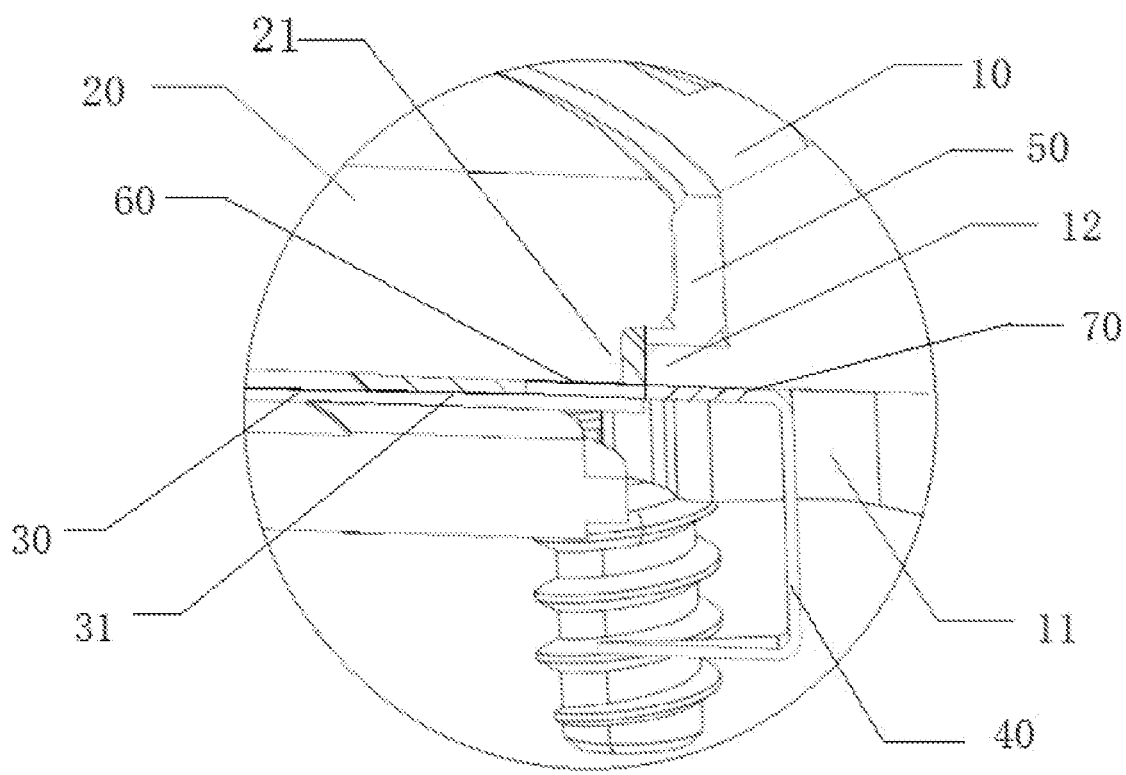
FIG. 1 is a schematic partial structural diagram of a combination structure for a touch device according to some embodiments of the present disclosure.

| 10 Annular outer frame | 11 Concave groove | 12 Carrier table |
|---|---|---|
| 20 Glass cover plate | 21 Step structure | 30 Touch control circuit board |
| 31 Wiring area | 40 Flexible circuit | 50 Sealing ring |
| 60 First connection area | 70 Second connection area | |

DETAILED DESCRIPTION OF THE EMBODIMENTS

To make purposes, technical solutions, and advantages of embodiments of the present disclosure clearer, embodiments of the present disclosure are described in detail in connection with the accompanying drawings. Described embodiments are some embodiments of the present disclosure, not all embodiments. Based on embodiments of the present disclosure, all other embodiments obtained by those of ordinary skill in the art without creative efforts are within the scope of the present disclosure.

In the description of the present disclosure, reference terms such as "an embodiment," "some embodiments," "examples," "specific examples," or "some examples" refer to that specific features, structures, materials, or characteristics described in conjunction with embodiments or examples are included in at least one embodiment or example of the present disclosure. Moreover, the specific features, structures, materials, or characteristics can be combined in any one or more embodiments or examples in an appropriate manner. In addition, when there is no conflict, those skilled in the art can combine and group different embodiments or examples and features of different embodiments or examples.

In addition, terms such as "first" and "second" are used for descriptive purposes only and should not be construed as indicating or implying relative importance or implying the quantity of the indicated technical features. Thus, a feature described in association with "first" and "second" can explicitly or implicitly include at least one of such feature. In the description of the present disclosure, "a plurality of" means two or more unless otherwise specified.

The implementation described in exemplary embodiments below does not represent all embodiments consistent with the present disclosure. On the contrary, the implementation only includes examples of methods, apparatuses, or devices that are consistent with some aspects of the present disclosure as detailed in the appended claims.

In an existing wearable device, since the touch control circuit layer is attached to the back side of the glass cover plate, and the glass cover plate abuts against the platform at the inner side of the face frame, the bending segment of the flexible circuit interferes with the structure of the face frame in a vertical direction. Thus, the joint area between the flexible circuit and the touch control circuit layer is increased, and the space for the bending segment is reduced.

Therefore, the joint area of the touch control circuit layer is increased, and the black edge of the display screen is increased, which affects the user experience and easily causes the touch screen to malfunction. Embodiments of the present disclosure provide a combination structure for a touch device, which is described in detail in connection with the accompanying drawings and embodiments.

Figure 2:
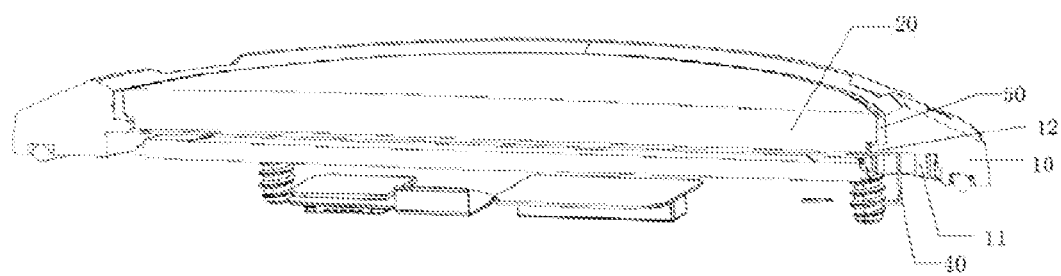
FIG. 2 is a schematic cross-sectional diagram of a combination structure for a touch device according to some embodiments of the present disclosure.

As shown in FIG. 1 and FIG. 2, embodiments of the present disclosure provide a combination structure for a touch device, including an annular outer frame 10, a glass cover plate 20, a touch control circuit board 30, and a flexible circuit 40. In some embodiments, the combination structure further includes a motherboard.

The glass cover plate 20 is arranged in the middle area of the annular outer frame 10 and connected to the annular outer frame 10.

The flexible circuit 40 is connected to the touch control board 30. In some embodiments, the motherboard is connected to the flexible circuit 40. The touch control circuit board 30, the flexible circuit 40, and the motherboard (if present) are arranged below the glass cover plate 20.

A concave groove 11 is provided at a lower end of the annular outer frame 10. The concave groove 11 can be at least configured to accommodate the flexible circuit 40. A step structure 21 is provided at the bottom of the glass cover plate 20.

In some embodiments, the concave groove 11 is configured in the annular outer frame 10 to reserve a sufficient bending area for the flexible circuit 40, which increases the area of the flexible circuit 40 outside the touch control circuit board and reduces a contact area between the flexible circuit 40 and the touch control circuit board 30. In embodiments of the present disclosure, the step structure 21 is provided at the bottom side of the glass cover plate 20. With the step structure 21, the touch control circuit board 30 below the glass cover plate 20 can have sufficient space to be arranged to extend from the middle area of the annular outer frame 10 to the area of the concave groove 11. Similarly, the connection area between the flexible circuit 40 and the glass cover plate 20 can also extend to the area of the concave groove 11 to more effectively reduce the black edge and improve the user experience.

In some embodiments, the bottom surface of the step structure 21 can be higher than the top surface of the concave groove 11, and the touch circuit board 30 can tightly abut against the step structure 21. Thus, a vertical height from the flexible circuit 40 on the step structure 21 to the concave groove 11 can be reduced to make the connection between the flexible circuit 40 and the touch control circuit board 30 more secure.

In some embodiments, the bottom surface of the step structure 21 can be lower than or flush with the top surface of the concave groove 11. When the bottom surface of the step structure 21 at the bottom of the glass cover plate 20 is lower than or flush with the top surface of the concave groove 11, sufficient space can be provided for the touch control circuit board 30 to extend from the middle area of the annular outer frame 10 to the area of the concave groove 11 without the need to bend the touch control circuit board 30 arranged below the step structure 21. Further, bending of the flexible circuit 40 in a direction along the touch control circuit board 30 can be reduced. Similarly, the connection area between the flexible circuit 40 and the glass cover plate 20 can also be extended to the area of the concave groove 11 to more effectively reduce the black edge and improve the user experience.

In some embodiments, the annular outer frame 10 can be a circle-like outer frame, a regular polygonal outer frame such as rectangle or square, or an irregular polygonal outer frame. The concave groove 11 can be a right-angled polygonal groove 11, or an arc-shaped groove 11, etc. The combination structure can be applied to a smart touch device such as a smartwatch or a smartphone. When applied to a smartwatch, the combination structure can have a circular outer frame 10. When applied to a smartphone, the combination structure can have a rectangular outer frame 10. The combination structure can be applied to different devices in other shapes, which are not described in detail here.

In embodiments of the present disclosure, a direction from the touch control circuit board 30 to the motherboard can be determined as a downside direction, and the direction opposite thereto can be determined as an upside direction. In embodiments of the present disclosure, the flexible circuit 40 and the motherboard being below the glass cover plate 20 may not indicate that the flexible circuit 40 and the motherboard are directly under the glass cover plate 20, as long as the flexible circuit 40 and the motherboard are at positions lower than the glass cover plate 20 in the vertical direction.

In some embodiments, in the structure of the touch device, the glass cover plate 20 can cover from the upper side. The touch circuit board 30, the display function layer, and the motherboard can be sequentially arranged from top to bottom. The touch circuit board 30 below the glass cover plate 20 can be connected to the flexible circuit 40 at the edge. The flexible circuit 40 can be connected to the motherboard after being bent by the concave groove 11.

In some embodiments, a carrier table 12 can be arranged at the annular outer frame 10. The glass cover plate 20 can be supported by the carrier table 12. The step structure 21 can be located in a middle space enclosed by the base table 12.

In embodiments of the present disclosure, by setting the carrier table 12 at the annular outer frame 10, on the one hand, the carrier table 12 can be configured to carry the glass cover plate 20; and on the other hand, the flexible circuit 40 can be extended below the carrier table 12, which solves the problem that the flexible circuit 40 easily breaks or falls off from the touch control circuit board 30 caused by the short bending segment when the bending segment of the flexible circuit 40 is too close to the connection area between the flexible circuit 40 and the touch control circuit board 30. The carrier table 12 can be an integral annular carrier table 12 or can include a plurality of protrusions for carrying the glass cover plate 20 together.

In some embodiments, the touch control circuit board 30 includes a wiring area 31. The wiring area 31 can be an electrical connection area between the touch control circuit board 30 and the flexible circuit 40.

In the existing technology, the touch control circuit board 30 is connected to the flexible circuit 40 at the edge. The connection part is usually directly under the glass cover plate 20. To shield the wiring area 31 and the flexible circuit 40, a black and nontransparent material is used for shielding, which results in the black edge. In embodiments of the present disclosure, the connection area between the touch control circuit board 30 and the flexible circuit 40, i.e., the wiring area, can be at least partially located below the carrier table 12. In some embodiments, the touch control circuit board 30 can be partially arranged below the carrier table 12. When the carrier table 12 is annular, the touch control circuit board 30 can be arranged at any position directly under the annular carrier table 12. The flexible circuit 40 can be connected to the touch control circuit board 30 at a position directly under the annular carrier table 12. That is, the wiring area 31 can be completely hidden under the carrier table 12. In some other embodiments, a part of the flexible circuit 40 can be directly under the annular carrier table 12 to be connected to the touch control circuit board 30, and another part of the flexible circuit 40 can be below the glass cover plate 20 or another position to be connected to the touch control circuit board 30. That is, the wiring area 31 can be partially hidden below the carrier table 12. However, with any of the above manners, the connection area, i.e., the exposed area of the wiring area 31 under the glass cover plate 20, can be greatly reduced, which effectively reduces the width of the black edge and improves the user experience. Similarly, when the carrier table 12 includes the plurality of protrusions, the connection area between the flexible circuit 40 and the touch control circuit board 30 can be arranged below the carrier table 12. That is, the wiring area 31 can be fully or partially arranged right under the carrier table to reduce the black edge.

In some embodiments, the connection area between the touch control circuit board 30 and the flexible circuit 40, i.e., the wiring area 31, can be at least partially located in the concave groove 11. In some embodiments, the touch control circuit board 30 can be moved to the area of the concave groove 11 from under the glass cover plate 20. In some embodiments, the flexible circuit 40 can be connected to the touch control circuit board 30 at the area of the concave groove 11. When the combination structure includes the carrier table 12, the flexible circuit 40 can be partially connected to the touch control circuit board 30 below the carrier table 12 and partially connected to the touch control circuit board 30 in the concave groove 11. In some embodiments, the whole wiring area 31 can be located in the concave groove 11. Thus, the user cannot see the wiring area 31 through the glass cover plate in the viewing range, and hence a design with no black edge can be realized.

In some embodiments, the wiring area 31 can be fully located under the middle space enclosed by the carrier table 12.

In some embodiments, a sealing ring 50 is arranged between the glass cover plate 20 and the annular outer frame 10. The sealing ring 50 can fix the glass cover plate 20 at the annular outer frame 10 through glue or interference fit to seal the device for waterproofing.

In some embodiments, the sealing ring 50 can be L-shaped. The L-shaped sealing ring 50 can include a vertical part and a horizontal part. The vertical part can be above the carrier table 12 between the glass cover plate 20 and the annular outer frame 10. The horizontal part can be between the carrier table 12 and the glass cover plate 20. Since the sealing ring 50 does not contact the touch control circuit board 30 and is stably installed, the touch control function is not affected.

In some embodiments, the glass cover plate 20 can include one or more layers of glass. When the glass cover plate 20 is a single layer, the step structure 21 matching the carrier table 12 can be formed by integrally processing at the lower end of the glass cover plate 20. When the glass cover plate 20 or the step structure 21 has a plurality of layers, the plurality of layers of glass can be connected through glue layers. In some embodiments, the upper glass layer can have a larger diameter and can be arranged at the carrier table 12. The glass layer having the step structure cooperating with the carrier table 12 can have a smaller diameter. Thus, the side surface of the glass layer can be stably installed with the carrier table 12 and can cooperate with the touch control circuit board 30.

In some embodiments, the step structure 21 can include a circular ring, and the touch control circuit board 30 can be arranged below the circular ring. In some embodiments, the circular ring can be a glass ring or a glue ring. The touch control circuit board 30 can be arranged below the circular ring to realize the touch control function. The middle area enclosed by the circular ring can be partially or fully filled with conductive glue. In some embodiments, when the outer circle of the circular ring is a glass ring, the inner side can be filled with conductive glue, the touch control function can also be implemented at the position filled with the conductive glue in the middle area in the circular ring. In some embodiments, the touch control circuit board 30 can be arranged below the glass cover plate 20 and the circular ring. In some other embodiments, the touch control circuit board 30 can be only arranged below the circular ring to realize the touch control function in the circular ring area. In some other embodiments, the touch control circuit board 30 can be also partially arranged at other areas of the glass cover plate 20. For example, the touch control circuit board 30 can be partially arranged in the middle area enclosed by the circular ring and partially arranged below the circular ring to realize the touch control needs.

In some embodiments, the outer wall of the circular ring can cooperate with the side surface of the carrier table 12. In embodiments of the present disclosure, the carrier table 12 can be in a step shape matching the circular ring of the step structure 21. The upper end of the glass cover plate 20 can be supported at the horizontal platform of the carrier table 12. The outer wall of the circular ring can abut against and be connected to the side surface of the carrier table 12 or can be connected to the side surface of the carrier table 12 through glue. In some embodiments, a gap can exist between the outer wall of the circular ring and the side surface of the carrier table 12, as long as the installation is stable and the touch control function is not affected.

In some embodiments, the step structure 21 can include a glue layer with a first thickness. The touch control circuit board 30 can be located below the step structure 21 and can be connected to the glue layer. In some embodiments, the first thickness of the glue layer can be arranged according to specific needs. By adjusting the first thickness of the glue layer, the touch control circuit board 30 and the flexible circuit 40 connected to the touch control circuit board 30 can be moved up and down in the vertical direction. Thus, the bottom surface of the step structure 21 can be lower than or flush with the top surface of the concave groove 11. Thus, the touch control circuit board 30 arranged below the step structure 21 can have sufficient space to extend from the middle area of the annular outer frame 10 to the area of the concave groove 11. Similarly, the connection area between the flexible circuit 40 and the step structure 21 can extend to the area of the concave groove 11. Thus, the black edge can be more effectively reduced, and the user experience can be improved.

In some embodiments, the step structure 21 can have another shape, such as a regular shape of a triangle or a rectangle or an irregular shape. The step structure 21 can have an integral structure or include a plurality of parts, for example, one-half of the step structure 21 can be a half-circle made of glass, and the other half of the step structure 21 can have a half-annular-ring shape made of glass. The bottom surface of the step structure 21 can be flat, inclined, or irregular.

In some embodiments, since the width of the annular outer frame 10 gradually increases from top to bottom, the concave groove 11 can be arranged at the lower side of the annular outer frame 10 to obtain a larger width space. Since the width of the lower side of the annular outer frame 10 is relatively large, by arranging the concave groove 11 at the lower side, on the one hand, the structural strength of the annular outer frame 10 may not be affected; and on the other hand, a sufficient bending area can be reserved for the flexible circuit 40 to greatly reduce the contact area between the flexible circuit 40 and the touch control circuit board 30, i.e., greatly reducing the area of the joint area. In some embodiments, the outer side wall of the annular outer frame 10 can be in an arc shape, and the width of the annular outer frame 10 can be gradually increased from top to bottom. The outer side wall of the annular outer frame 10 can be in a straight line shape, and the width of the annular outer frame 10 can be gradually increased from top to bottom, i.e., substantially a step-like structure. The step-like structure can be a step structure or a structure similar to the step structure. For example, one or more edges of the stepped-type structure can be curved lines including 5 or more line segments or curved line sets. In some other embodiments, the annular outer frame 10 can also have a shape with a wider bottom and a narrower top. The structures are not listed one by one here.

In some embodiments, the width of the concave groove 11 gradually increases from top to bottom. Then, by adjusting the thickness of the glue layer, or the thickness or number of layers of the glass cover plate 20, the touch control circuit board 30 and the flexible circuit 40 can be moved downward to obtain more sufficient space in the concave groove 11 for bending, which helps greatly reduce the contact area between the flexible circuit 40 and the touch control circuit board 30. Thus, the width of the black edge can be reduced, and the user experience can be improved.

In some embodiments, the flexible circuit 40 can be connected to the top surface of the concave groove 11. In some embodiments, by arranging an installation component at the concave groove 11 to install the flexible circuit 40 or connecting the flexible circuit 40 at the top of the concave groove 11 through glue, wiring guidance and position-limiting protection can be performed on the flexible circuit 40.

In some embodiments, an installation member can be arranged at the side wall of the concave groove 11. The installation member can be configured to limit the position of the flexible circuit 40. In some embodiments, the installation member can include a position-limiting slot, a position-limiting clip, a predetermined part for installing the flexible circuit, or other structures. Specific structures of the installation member are not listed here, as long as the structure can be configured to assist in arranging the flexible circuit 40 to prevent displacement of the flexible circuit 40 and ensure stable installation.

In some embodiments, the flexible circuit 40 can be connected to the bottom surface of the touch control circuit board 30 and/or the step structure 21 through glue or other means. The area of the flexible circuit 40 connected to the bottom surface of the touch control circuit board 30 and/or the step structure 21 can be determined as the first joint area 60, and the area of the flexible circuit 40 connected to the concave groove 11 can be determined designated as the second joint area 70. In some embodiments of the present disclosure, the flexible circuit 40 can also be simultaneously connected to the concave groove 11. For example, the flexible circuit 40 can be connected to the installation member of the concave groove 11. Thus, the joint of the first joint area 60 can be implemented between the flexible circuit 40 and the bottom surface of the touch control circuit board 30 and/or the step structure 21, and the joint of the second joint area 70 can be implemented between the flexible circuit 40 and the concave groove 11. With the joint of the plurality of areas, the joint strength of the installation structure can be ensured. In addition, even if the flexible circuit 40 moves caused by a factor such as an external force, only the flexible circuit 40 in the concave groove 11 can be affected first, and the connection area of the flexible circuit 40 and the touch control circuit board 30 can be ensured to be stable. In some embodiments, since the wiring area 31 is located in the concave groove 11, the combination structure may not include the joint of the first joint area 60 and may only include the joint of the flexible circuit 40 at the installation member of the concave groove 11.

Another aspect of embodiments of the present disclosure provides a wearable device, including the combination structure of the touch device of an embodiment of the present disclosure. In some embodiments, the wearable device can include a cell phone or a watch. When the wearable device is a cell phone, the wearable device can further include other members such as a processor, a battery, and a communication module. When the wearable device is a watch, the wearable device can include a battery, a watch band, etc. For the combination structure of the wearable device, reference can be made to the embodiments above, which is not repeated here.

The above are merely some embodiments of the present disclosure. However, the scope of the present disclosure is not limited to this. Those skilled in the art can easily think of modifications or replacements to embodiments of the present disclosure. These modifications and replacements should be within the scope of the present disclosure. Thus, the scope of the invention should be subject to the scope of the appended claims.

What is claimed is:

1. A combination structure comprising:
   an annular outer frame;
   a glass cover plate arranged at a middle area of the annular outer frame and connected to the annular outer frame;
   a touch control circuit board; and
   a flexible circuit connected to the touch control circuit board;
   wherein:
   the touch control circuit board and the flexible circuit are arranged below the glass cover plate;
   a lower end of the annular outer frame includes a concave groove configured to accommodate the flexible circuit;
   a bottom surface of the glass cover plate includes a step structure; and
   a bottom surface of the step structure is lower than or flush with a top surface of the concave groove.

2. The combination structure according to claim 1, wherein the annular outer frame includes a carrier table, and the glass cover plate is arranged on the carrier table.

3. The combination structure according to claim 2, wherein the touch control circuit board includes a wiring area configured to be electrically connected to the flexible circuit.

4. The combination structure according to claim 3, wherein the wiring area is entirely under the carrier table.

5. The combination structure according to claim 3, wherein the wiring area is at least partially below the carrier table.

6. The combination structure according to claim 3, wherein the wiring area is entirely under a middle space enclosed by the carrier table.

7. The combination structure according to claim 3, wherein the wiring area is at least partially within the concave groove.

8. The combination structure according to claim 2, wherein the step structure includes a ring, and the touch control circuit board is arranged below the ring.

9. The combination structure according to claim 8, wherein an outer wall of the ring matches a side surface of the carrier table.

10. The combination structure according to claim 1, wherein the flexible circuit is connected to a top surface of the concave groove.

11. The combination structure according to claim 1, wherein the flexible circuit is connected to at least one of the bottom surface of the step structure or the touch control circuit board.

12. The combination structure according to claim 1, further comprising:
a sealing ring arranged between the glass cover plate and the annular outer frame.

13. The combination structure according to claim 12, wherein:
the sealing ring is L-shaped and includes a vertical part and a horizontal part;
the vertical part is located above the carrier table between the glass cover plate and the annular frame; and
the horizontal part is located between the carrier table and the glass cover board.

14. The combination structure according to claim 1, wherein at least one of the glass cover plate or the step structure includes one or more layers of glass.

15. The combination structure according to claim 1, wherein:
the step structure includes a glue layer; and
the touch control circuit board is under the step structure and connected to the glue layer.

16. The combination structure according to claim 1, wherein a side wall of the concave groove includes a mounting member configured to limit a position of the flexible circuit.

17. The combination structure according to claim 1, wherein a width of the annular outer frame gradually increases from top to bottom.

18. The combination structure according to claim 1, wherein a width of the concave groove gradually increases from top to bottom.

19. A wearable device comprising:
a combination structure of a touch device, including:
an annular outer frame;
a glass cover plate arranged in a middle area of the annular outer frame and connected to the annular outer frame;
a touch control circuit board; and
a flexible circuit connected to the touch control circuit board;
wherein:
the touch control circuit board and the flexible circuit are arranged below the glass cover plate;
a lower end of the annular outer frame includes a concave groove configured to accommodate the flexible circuit;
a bottom surface of the glass cover plate includes a step structure; and
a bottom surface of the step structure is lower than or flush with a top surface of the concave groove.

* * * * *